(12) United States Patent
Yang (10) Patent No.: US 10,500,543 B2
(45) Date of Patent: *Dec. 10, 2019

(54) WATER FILTRATION SYSTEM

(71) Applicants: FOSHAN SHUNDE MIDEA WATER DISPENSER MFG. CO., LTD, Foshan (CN); MIDEA GROUP CO., LTD., Foshan (CN)

(72) Inventor: Lyu Yang, Foshan (CN)

(73) Assignees: FOSHAN SHUNDE MIDEA WATER DISPENSER MFG. CO., LTD., Foshan (CN); MIDEA GROUP CO. LTD., Foshan (CN)

( * ) Notice: Subject to any disclaimer, the term of this patent is extended or adjusted under 35 U.S.C. 154(b) by 30 days.

This patent is subject to a terminal disclaimer.

(21) Appl. No.: 15/863,687

(22) Filed: Jan. 5, 2018

(65) Prior Publication Data

US 2018/0257036 A1 Sep. 13, 2018

Related U.S. Application Data

(63) Continuation of application No. PCT/CN2017/087307, filed on Jun. 6, 2017.

(30) Foreign Application Priority Data

Mar. 7, 2017 (CN) .......................... 2017 1 0132132
Mar. 7, 2017 (CN) ..................... 2017 2 0222524 U (51) Int. Cl.
*B01D 61/12* (2006.01)
*C02F 1/44* (2006.01)
*B01D 61/02* (2006.01)
*B01D 61/04* (2006.01)
*C02F 1/00* (2006.01)

(52) U.S. Cl.
CPC .......... *B01D 61/12* (2013.01); *B01D 61/025* (2013.01); *B01D 61/027* (2013.01); *B01D 61/04* (2013.01);

(Continued)

(58) Field of Classification Search
CPC ........ B01D 2311/2649; B01D 2313/18; B01D 2313/243; B01D 61/025; B01D 61/027;
(Continued)

(56) References Cited

U.S. PATENT DOCUMENTS

2013/0048549 A1 2/2013 Burrows

FOREIGN PATENT DOCUMENTS

CN 201746403 U 2/2011
CN 102942261 A 2/2013
(Continued)

OTHER PUBLICATIONS

Midea, International Search Report and Written Opinion, PCT/CN2017/087307, dated Dec. 18, 2017, 13 pgs. (No translation available).

(Continued)

*Primary Examiner* — Terry K Cecil
(74) *Attorney, Agent, or Firm* — Morgan, Lewis & Bockius LLP (57) ABSTRACT

A water filtration system (100) is provided. The water filtration system (100) includes: a filter cartridge assembly (10), a water-intake pipe (20), a purified-water pipeline (30), a pure-water pipeline (40) and a waste discharge pipeline (50). The filter cartridge assembly (10) has a water inlet (110), a purified-water outlet (120), a purified-water return port (130), a pure-water outlet (140) and a waste discharge port (150). The pure-water pipeline (40) is communicated with the pure-water outlet (140), and the pure-water pipeline (40) has a pure-water external port (410) and a second valve (420) configured to control on and off of the pure-water pipeline (40). The waste discharge pipeline (50) has a first end communicated with the waste discharge port (150) and a second end communicated with an outside.

9 Claims, 2 Drawing Sheets (52) U.S. Cl.
CPC ............... *C02F 1/001* (2013.01); *C02F 1/008* (2013.01); *C02F 1/441* (2013.01); *B01D 2311/2649* (2013.01); *B01D 2313/18* (2013.01); *B01D 2313/243* (2013.01); *C02F 1/442* (2013.01); *C02F 2301/046* (2013.01)

(58) Field of Classification Search
CPC ......... B01D 61/04; B01D 61/12; C02F 1/001; C02F 1/008; C02F 1/441; C02F 1/442; C02F 2301/046
See application file for complete search history.

(56) References Cited

FOREIGN PATENT DOCUMENTS

| | | |
|---|---|---|
| CN | 203728658 U | 7/2014 |
| CN | 204097252 U | 1/2015 |
| CN | 204550229 U | 8/2015 |
| CN | 204550231 U | 8/2015 |
| CN | 204625367 U | 9/2015 |
| CN | 105084571 A | 11/2015 |
| CN | 205516831 U | 8/2016 |
| CN | 205773829 U | 12/2016 |
| KR | 10-0153587 B1 | 10/1998 |
| KR | 20020020426 A | 3/2002 |

OTHER PUBLICATIONS

Foshan Shunde Midea Water Dispenser Mfg Co Ltd, Supplementary European Search Report, dated Feb. 16, 2018, 4 pgs.

Foshan Shunde Midea Water Dispenser Mfg Co Ltd, Communication Pursuant to Article 94(3), EP17749593.4, dated Jan. 3, 2019, 13 pgs.

Notification of Reason for Refusal, KR10-2017-7023660, dated Nov. 21, 2018, 14 pgs.

WATER FILTRATION SYSTEM

PRIORITY CLAIM AND RELATED APPLICATION

This application is a continuation application of PCT/CN2017/087307, entitled "WATER FILTRATION SYSTEM" filed on Jun. 6, 2017, which claims priority to Chinese Patent Application No. 201720222524.4, filed with the State Intellectual Property Office of the People's Republic of China on Mar. 7, 2017, and entitled "WATER FILTRATION SYSTEM", and Chinese Patent Application No. 201710132132.3, filed with the State Intellectual Property Office of the People's Republic of China on Mar. 7, 2017, and entitled "WATER FILTRATION SYSTEM", all of which are incorporated herein by reference in their entirety.

TECHNICAL FIELD

The present disclosure relates to a technical field of house appliances, and specifically, more particularly to a water filtration system.

BACKGROUND

In the related art, the water filtration system only uses a one-stage filter membrane to filter water and hence the water is not processed by fine filtration, so the filter effect is not ideal and physical health will be influenced in the case of drinking the water directly. In the related art, the water filtration system adopting a multi-stage filter cartridge has disadvantages of a complicated pipeline, too many joints and a large volume. In addition, waste is caused when pure water obtained after being processed by the multi-state filter cartridge serves as domestic water for cleaning clothes, taking showers and watering flowers. Furthermore, waste water produced in the filtration process is discharged directly, which has a low utilization rate, thus causing waste of water resources.

SUMMARY

The present disclosure seeks to solve at least one of the technical problems existing in the related art. Thus, the present disclosure provides a water filtration system, which has a compact structure and saves water resources.

The water filtration system according to embodiments of the present disclosure includes: a filter cartridge assembly having a water inlet, a purified-water outlet, a purified-water return port, a pure-water outlet and a waste discharge port; a water-intake pipe communicated with the water inlet; a purified-water pipeline configured to connect the purified-water outlet to the purified-water return port, the purified-water pipeline being provided with a purified-water external port and a first valve configured to control on and off of the purified-water pipeline; a pure-water pipeline communicated with the pure-water outlet, the pure-water pipeline being provided with a pure-water external port and a second valve configured to control on and off of the pure-water pipeline; a waste discharge pipeline having a first end communicated with the waste discharge port and a second end communicated with an outside; and a circulation pipeline having a first end communicated with the purified-water pipeline and a second end communicated with the waste discharge pipeline. When the water filtration system produces purified water, the purified-water pipeline is on and the pure-water pipeline is off. When the water filtration system produces pure water, the purified-water pipeline, the pure-water pipeline and the waste discharge pipeline are on respectively.

In the water filtration system according to embodiments of the present disclosure, by providing the filter cartridge assembly, the water filtration system has a compact structure and an optimized pipeline arrangement. In addition, by providing the purified-water pipeline and the pure-water pipeline in the water filtration system respectively, external ports for different water qualities may be selected according to different requirements for water usage in life, which is facilitates operations, reduces waste, saves energy and decreases consumption. Furthermore, by providing the circulation path in the water filtration system, the waste water may be recycled, and thus the water resources are saved.

According to some embodiments of the present disclosure, the water filtration system further includes a pump assembly configured to drive water in the pure-water pipeline to flow, in which the pump assembly is disposed in the purified-water pipeline and located between the purified-water external port and the purified-water return port. Thus, the water flow may be provided with a sufficient water pressure so as to be finely filtered.

According to some embodiments of the present disclosure, the pump assembly is a booster pump. Thus, the water flow may be provided with the sufficient water pressure so as to be finely filtered by means of the booster pump.

According to some embodiments of the present disclosure, the first valve is located upstream of the pump assembly. Thus, it is convenient for a water flow control of the water filtration system, and the water filtration system is protected from being damaged due to a faulty manipulation.

According to some embodiments of the present disclosure, the first end of the circulation pipeline is connected between the first valve and the pump assembly. Thus, it is possible to improve a control effect of the first valve on the whole water filtration system and also to pressurize the waste water in the circulation pipeline returning to the purified-water pipeline by means of the pump assembly, so that the water flow may flow back into the filter cartridge assembly to be filtered again.

According to some embodiments of the present disclosure, the first valve is a solenoid valve and the second valve is a check valve. Thus, by configuring the first valve as the solenoid valve, it is possible to improve an accuracy and an sensitivity of the operation of the first valve, which facilitates control of the first valve. By configuring the second valve as the check valve, the water flow in the pure-water pipeline is allowed to flow unidirectionally.

According to some embodiments of the present disclosure, the waste discharge pipeline is provided with a third valve configured to control on and off of the waste discharge pipeline. Thus, the waste discharge pipeline may be blocked and unblocked by means of the third valve, and a flow rate of the waste water may be adjusted by the third valve.

According to some embodiments of the present disclosure, the third valve is a solenoid valve. Thus, an accuracy and an sensitivity of the control of the third valve may be improved.

According to some embodiments of the present disclosure, the circulation pipeline is provided with a throttle valve. Thus, the flow rate of the waste water in the circulation pipeline may be controlled by the throttle valve.

According to some embodiments of the present disclosure, the filter cartridge assembly includes: a pre-filter cartridge located between the water inlet and the purified-water outlet; a fine filter cartridge located at the purified-water return port; and a post filter cartridge located at the pure-water outlet. The waste discharge port is located between the fine filter cartridge and the post filter cartridge. Thus, on one hand, the multi-stage filter cartridges may be integrated in the filter cartridge assembly, which allows the water filtration system to have a compact overall structure; on the other hand, a filtration effect of the water filtration system may be improved further, which improves a water quality of the filtered water.

According to some embodiments of the present disclosure, the fine filter cartridge is a reverse osmosis filter cartridge or a nanofiltration membrane filter cartridge. Thus, the impurities, bacteria and virus in the water may be filtered out effectively by using the reverse osmosis membrane, and the requirement for the water pressure in the fine filtration process of the water filtration system may be reduced by using the nanofiltration membrane filter cartridge, so that the energy consumption is saved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS water filtration system 100,
filter cartridge assembly 10, water inlet 110, purified-water outlet 120, purified-water return port 130, pure-water outlet 140, waste discharge port 150,
water-intake pipe 20,
purified-water pipeline 30, purified-water external port 310, purified-water external-port switch 311, first valve 320,
pure-water pipeline 40, pure-water external port 410, pure-water external-port switch 411, second valve 420,
waste discharge pipeline 50, third valve 510,
pump assembly 60,
circulation pipeline 70, throttle valve 710.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the specification, it is to be understood that terms such as "upper," "lower," "front," "rear," "left," "right," "vertical," and "horizontal" should be construed to refer to the orientation as then described or as shown in the drawings under discussion. These relative terms are for convenience of description and do not require that the present disclosure be constructed or operated in a particular orientation, thus cannot be construed to limit the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

A water filtration system 100 according to embodiments of the present disclosure will be described in the following with reference to FIG. 1 and FIG. 2.

Figure 1:
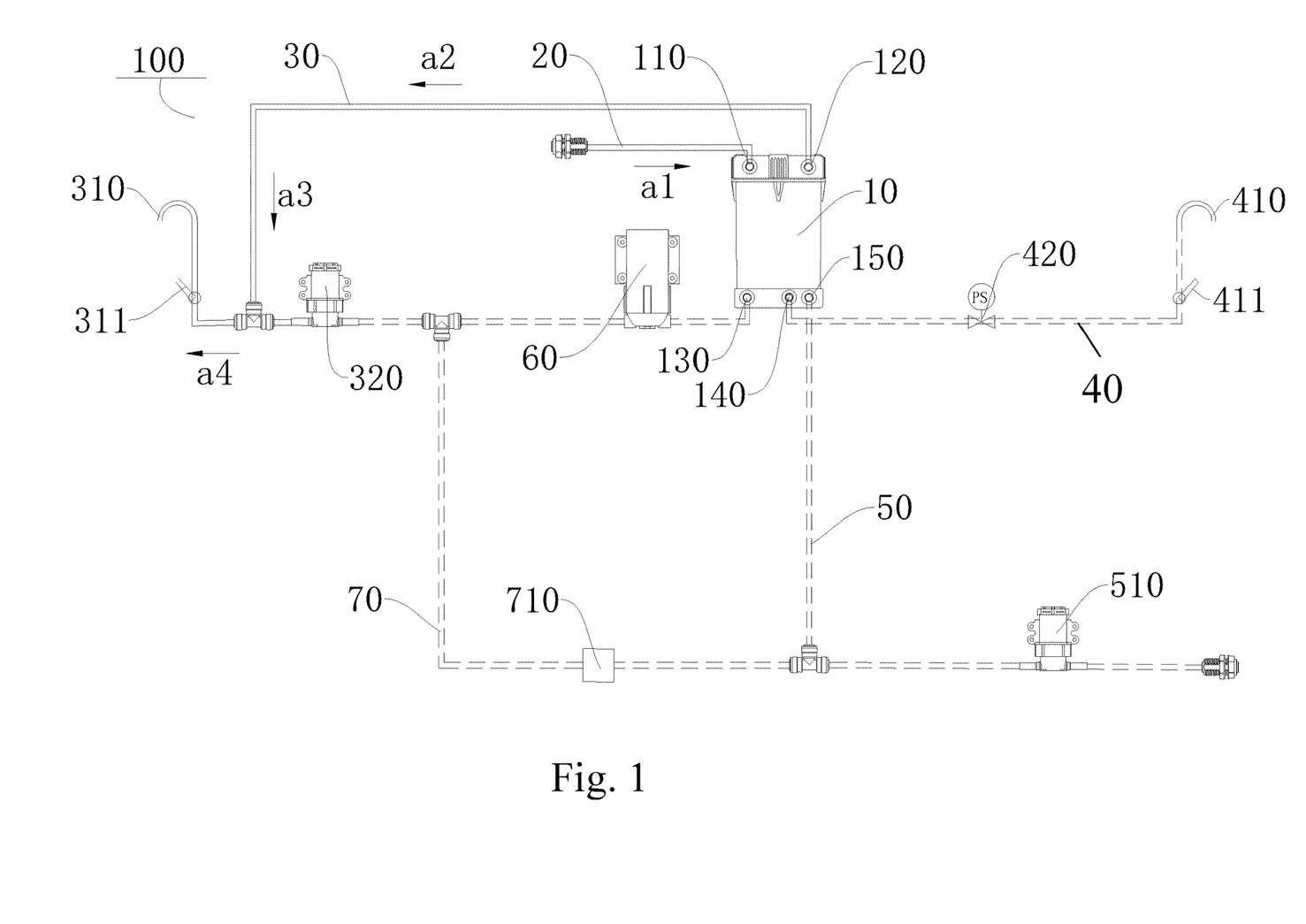
FIG. 1 is a schematic view of a water filtration system according to embodiments of the present disclosure, in which the water filtration system is in a work state of producing purified water, a dashed-line pipeline illustrated in the drawing is in a blocked state, and a direction indicated by an arrow is a flow direction of a water flow in the water filtration system.
Figure 2:
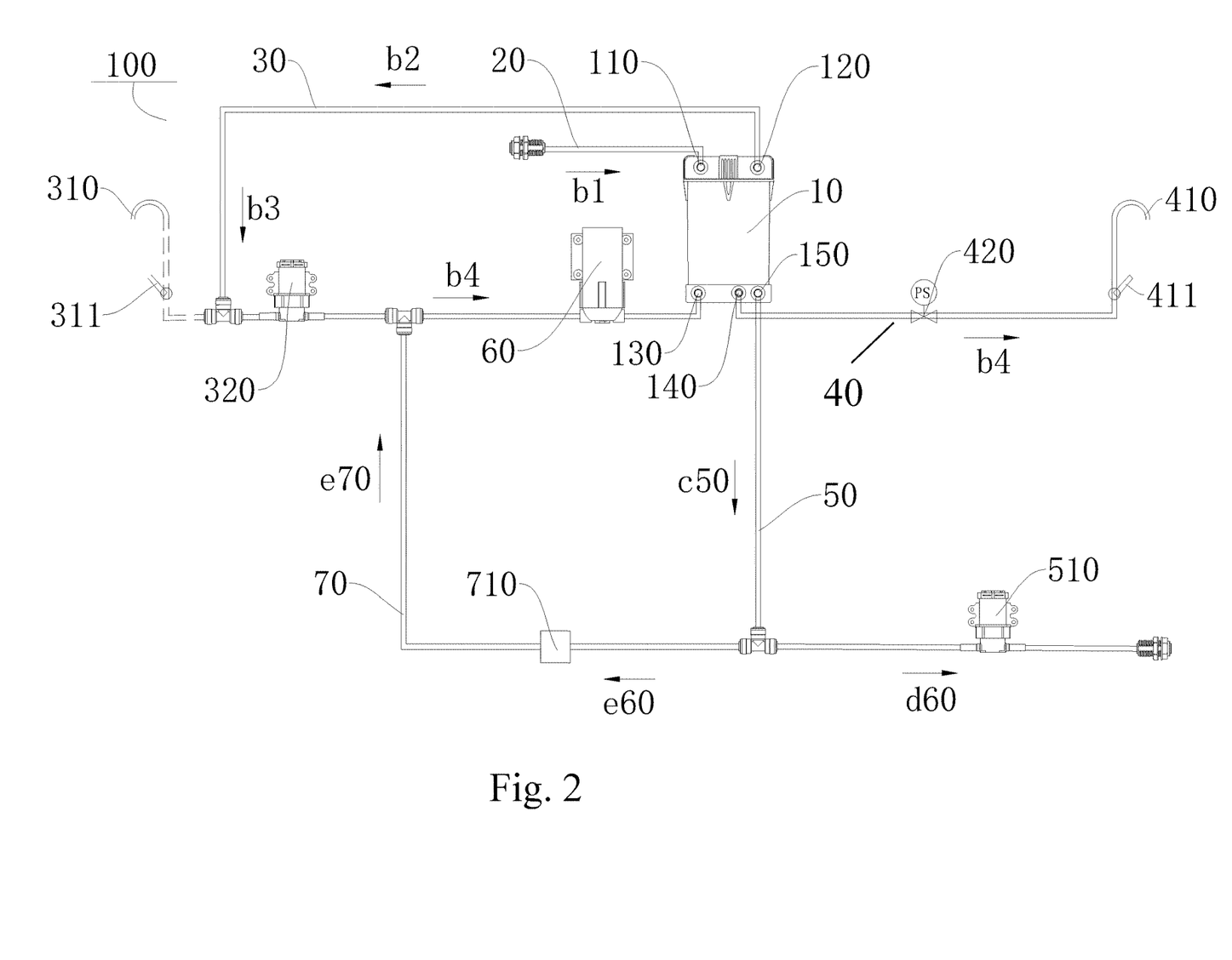
FIG. 2 is a schematic view of a water filtration system according to embodiments of the present disclosure, in which the water filtration system is in a work state of producing pure water, a dashed-line pipeline illustrated in the drawing is in a blocked state, and a direction indicated by an arrow is a flow direction of a water flow in the water filtration system.

As illustrated in FIG. 1 and FIG. 2, the water filtration system 100 according to embodiments of the present disclosure includes: a filter cartridge assembly 10, a water-intake pipe 20, a purified-water pipeline 30, a pure-water pipeline 40, a waste discharge pipeline 50 and a circulation pipeline 70.

Specifically, as illustrated in FIG. 1 and FIG. 2, the filter cartridge assembly 10 has a water inlet 110, a purified-water outlet 120, a purified-water return port 130, a pure-water outlet 140 and a waste discharge port 150. It should be noted that the filter cartridge assembly 10 may be an integrated composite filter cartridge. For example, the filter cartridge assembly 10 may include a pre-filter cartridge, a fine filter cartridge and a post filter cartridge. By adopting the integrated composite filter cartridge, it is possible to simplify the water filtration system 100, optimize a pipeline arrangement, and realize a synchronous replacement of different filter cartridges, which is convenient to use. The water-intake pipe 20 is communicated with the water inlet 110, and raw water may pass through the water-intake pipe 20 and further enter the filter cartridge assembly 10 to be filtered via the water inlet 110. For example, a filtration of the raw water in the filter cartridge assembly 10 may be in this order: the pre-filter cartridge→the fine filter cartridge→the post filter cartridge. The "raw water" described herein may refer to water flowing out of a water faucet directly, and may also refer to well water or stored water. The purified-water pipeline 30 communicates the purified-water outlet 120 and the purified-water return port 130, and has a purified-water external port 310 and a first valve 320 configured to control on and off of the purified-water pipeline 30. The pure-water pipeline 40 is communicated with the pure-water outlet 140, and has a pure-water external port 410 and a second valve 420 configured to control on and off of the pure-water pipeline 40.

The waste discharge pipeline 50 has a first end communicated with the waste discharge port 150 and a second end communicated with an outside. The circulation pipeline 70 has a first end communicated with the purified-water pipeline 30 and a second end communicated with the waste discharge pipeline 50. Accordingly, waste water flowing out of the waste-water pipeline 50 may partially return to the purified-water pipeline 30 to be filtered again through the circulation pipeline 70, so that the waste water may be recycled and waste of water resources is reduced.

When the water filtration system 100 produces purified water, as illustrated in FIG. 1, a part of the purified-water pipeline 30 is on, while the pure-water pipeline 40, the waste discharge pipeline 50 and the circulation pipeline 70 are blocked (the pipelines in dashed lines illustrated in FIG. 1 are blocked pipelines), and the water in the water filtration system 100 flows in a direction indicated by arrows: a1→a2→a3→a4. As illustrated in FIG. 1, the raw water flows through the water-intake pipe 20 and further enters the filter cartridge assembly 10 via the water inlet 110 to be filtered preliminarily so as to produce the purified water. The purified water flows out of the filter cartridge assembly 10 via the purified-water outlet 120 and further flows out of the purified-water external port 310, and thus the purified water is obtained. The purified water obtained after the preliminary filtration can serve as domestic water for cleaning clothes, watering flowers and taking showers.

When the water filtration system 100 produces pure water, as illustrated in FIG. 2, the purified-water pipeline 30, the pure-water pipeline 40 and the waste discharge pipeline 50 are on, and the water in the water filtration system 100 flows in a direction indicated by arrows: b1→b2→b3→b4→b5. As illustrated in FIG. 2, when the pure water is produced, the first valve 320 in the purified-water pipeline 30 is opened, and the second valve 420 in the pure-water pipeline 40 is also opened. The raw water flows through the water-intake pipe 20 and further enters the filter cartridge assembly 10 via the water inlet 110 to be filtered preliminarily so as to produce the purified water. The purified water is discharged out of the purified-water outlet 120, further flows along the purified-water pipeline 30 and returns to the filter cartridge assembly 10 via the purified-water return port 130 to be finely filtered. The pure water obtained after the fine filtration flows out of the pure-water outlet 140 and further out of the pure-water pipeline 40, and thus the pure water is obtained. The pure water obtained after the fine filtration may be drunk directly.

It should be noted that waste water may be produced in the process of pure water preparation, the waste water is discharged out of the waste discharge port 150, then flows through the waste discharge pipeline 50, and is further discharged out of the water filtration system 100 directly (for example a flow direction illustrated in FIG. 2 by arrows: c50→d60). A part of the waste water may return to the purified-water pipeline 30 through the circulation pipeline 70 (for example a flow direction illustrated in FIG. 2 by arrows: c50→e60→e70), and further flow into the filter cartridge assembly 10 to be filtered again. Thus, the waste water may be recycled and the water resources are saved.

In the water filtration system according to embodiments of the present disclosure, by providing the filter cartridge assembly 10, the water filtration system 100 has a compact structure and an optimized pipeline arrangement. In addition, by providing the purified-water pipeline 30 and the pure-water pipeline 40 in the water filtration system 100 respectively, external ports for different water qualities may be selected according to different requirements for water usage in life, which facilitates operations, reduces waste, saves energy and decreases consumption. Furthermore, by providing the circulation path to the water filtration system 100, the waste water may be recycled and the water resources are saved.

In some embodiments of the present disclosure, as illustrated in FIG. 1 and FIG. 2, the water filtration system 100 may further include a pump assembly 60 configured to drive water in the pure-water pipeline 40 to flow. The pump assembly 60 is disposed in the purified-water pipeline 30 and located between the purified-water external port 310 and the purified-water return port 130. Thus, it is possible to increase a water flow pressure by means of the pump assembly 60, which is beneficial to improving a filtration efficiency of the water filtration system 100. It should be noted that when the purified water needs to be finely filtered, the purified water needs to reach a certain water pressure. By disposing the pump assembly 60 between the purified-water external port 310 and the purified-water return port 130, it is possible to increase the water pressure of a purified water flow, so as to allow the purified water flow to flow into the filter cartridge assembly 10 to be finely filtered.

Further, the pump assembly 60 may be a booster pump. Thus, by providing the booster pump, a sufficient water pressure may be provided for the purified water flow, so as to allow the purified water flow to pass through the filter cartridge assembly 10 to be finely filtered.

Alternatively, the first valve 320 is located upstream of the pump assembly 60. Thus, it is possible to control on and off of a water path timely by controlling the first valve 320. The "upstream" mentioned herein may refer to the upstream understood in accordance with the water flow direction during the preparation of pure water as illustrated in FIG. 2. It may be understood that when the first valve 320 is closed, the pure-water path is in a blocked state (for example the pipelines in dashed lines illustrated in FIG. 1); and when the first valve 320 is opened, as illustrated in FIG. 2, the pure-water pipeline 40 is in an unblocked state. By disposing the first valve 320 upstream of the pump assembly 60, the water filtration system 100 may be prevented from being damaged due to a faulty manipulation. For example, if the first valve 320 is disposed downstream of the pump assembly 60, when the first valve 320 is closed and the pump assembly 60 is not turned off, the water flow after being pressurized by the pump assembly 60 is likely to cause the pipeline to crack, and thus the water filtration system 100 is damaged.

In addition, as illustrated in FIG. 2, by disposing the first valve 320 and the pump assembly 60 between the purified-water outlet 120 and the purified-water return port 130, the water flow is required to be filtered preliminarily in the filter cartridge assembly 10 before flowing into the first valve 320 and the pump assembly 60. Thus, it is possible to prevent impurities in large particles in the raw water from flowing into the first valve 320 and the pump assembly 60, so as not to damage the first valve 320 and the pump assembly 60. Therefore, the first valve 320 and the pump assembly 60 are protected, and service lives of the first valve 320 and the pump assembly 60 are prolonged.

In some embodiments of the present disclosure, the first end of the circulation pipeline 70 is connected between the first valve 320 and the pump assembly 60. As illustrated in FIG. 2, a downstream connecting end of the circulation pipeline 70 is connected between the first valve 320 and the pump assembly 60. The "downstream of the circulation pipeline 70" mentioned herein may refer to the downstream understood in accordance with a flow direction of the waste water in the circulation pipeline 70 as illustrated in FIG. 2. Thus, in the process of pure water preparation, a part of the waste water produced may return to the purified-water pipeline 30 through the circulation pipeline 70, and may be pressurized by the pump assembly 60. The water flow after the pressurization may flow into the filter cartridge assembly 10 again to be filtered again, so that the waste water may be fully utilized. By disposing the first valve 320 upstream of a water return end of the circulation pipeline 70, it is beneficial for the control of the water filtration system 100. For example, when the first valve 320 is closed, it is possible to cut off a water path system downstream of the first valve 320 timely (as illustrated by the pipelines in dashed lines in FIG. 1).

According to some embodiments of the present disclosure, the first valve 320 may be a solenoid valve. By configuring the first valve 320 as the solenoid valve, on one hand, the solenoid valve is accurate and reliable in operation, which is beneficial for improving a reliability and a stability of the operation of the water filtration system 100; on the other hand, with respect to a manual valve, it is possible to reduce a physical work for opening or closing the first valve 320 by adopting the solenoid valve, which is beneficial for improving an overall performance of the water filtration system 100.

Alternatively, the second valve 420 may be a check valve. By adopting the check valve as the second valve 420, the pure water flowing out of the pure-water pipeline 40 may flow unidirectionally, i.e., flowing from the pure-water outlet 140 to the pure-water external port 410 (for example a flow direction indicated by an arrow b5 in FIG. 2). In addition, in some examples of the present disclosure, the check valve may be used to perform a feedback control on the water filtration system 100. As illustrated in FIG. 1 and FIG. 2, a pure-water external-port switch 411 is provided at the pure-water external port 410 of the pure-water pipeline 40, and the second valve 420 may be configured as a check-valve high-pressure switch. The check-valve high-pressure switch may detect a pressure change downstream of the check valve and feed a signal of the pressure change back to the system. The system may adjust opening and closure of the first valve 320 as well as on and off of the pump assembly 60 according to the feedback signal.

For example, as illustrated in FIG. 1, when the pure-water external-port switch 411 is opened, the check-valve high-pressure switch detects that a downstream water pressure becomes larger, so that the system may close the first valve 320 and turn off the pump assembly 60 according to the signal indicating an increased water pressure, and thus the pure-water pipeline 40 is cut off and the purified water flows out of the purified-water external port 310. As illustrated in FIG. 2, when the pure-water external-port switch 411 is closed, the check-valve high-pressure switch detects that the downstream water pressure becomes smaller, so that the system may open the first valve 320 and turn on the pump assembly 60 according to the signal indicating a decreased water pressure, in which case a purified-water external-port switch 311 is opened and thus the pure water is produced and used.

In some embodiments of the present disclosure, the waste discharge pipeline 50 is provided with a third valve 510 configured to control on and off of the waste discharge pipeline 50. Thus, by disposing the third valve 510, the waste discharge pipeline 50 may be blocked or unblocked, and also a flow rate of the waste water may be adjusted. It is worth understanding that the flow rate of the waste water may be adjusted by means of the third valve 510. For example, when the flow rate of the waste water is reduced by controlling the third valve 510, the water flow may be provided with a sufficient water pressure so as to be finely filtered. When the flow rate of the waste water is increased by controlling the third valve 510, and the pure-water external-port switch 411 and the purified-water external-port switch 311 are opened, the water flow in the water filtration system 100 may flow in a direction indicated by arrows: b1→b2→b3→c4→c5, as illustrated in FIG. 2. It should be noted that the impurities may be accumulated at the fine filter cartridge in the process of the fine filtration. After a long term use, a large amount of impurities are accumulated at the fine filter cartridge. Thus, by increasing the flow rate in the waste-water path and opening the pure-water external-port switch 411 and the purified-water external-port switch 311, it is possible to wash and clean the fine filter cartridge. Thus, the fine filter cartridge may be protected, and the service life of the fine filter cartridge may be prolonged.

Further, the third valve 510 may be the solenoid valve. Thus, it is possible to control closing and opening of the third valve 510 conveniently and accurately. It should be noted that the third valve 510 may be in an off state when producing the purified water and the pure water normally. When the third valve 510 is in the off state, the third valve 510 is provided with a through hole of small flow rate, which may maintain the water pressure required for producing the pure water by the water filtration system 100 on one hand, and also may discharge out the waste water produced when producing the pure water on the other hand. When the fine filter cartridge needs to be cleaned, the third valve 510 may be energized to be placed in an open state, in which case the pure-water external-port switch 411 and the purified-water external-port switch 311 are opened, so that a waste water flux may be improved by increasing the flow rate of the waste water, thus cleaning the fine filter cartridge.

According to some embodiments of the present disclosure, the circulation pipeline 70 is provided with a throttle valve 710. Thus, it is possible to control the flow rate of the waste water in the circulation pipeline 70 by means of the throttle valve 710. For example, when the raw water has a good water quality, the third valve 510 may be turned down and the throttle valve 710 may be turned up, so that the flow rate of the waste water in the circulation pipeline 70 is increased, so as to improve a utilization rate of the waste water. When the raw water has a poor water quality, the third valve 510 may be turned up and the throttle valve 710 may be turned down or closed, so that the flow rate of the waste water in the circulation pipeline 70 is decreased, so as to prevent the waste water including too many impurities from returning to the purified-water pipeline 30, and thus the pump assembly 60 and the filter cartridge assembly 10 are protected from being damaged, and a normal operation of the water filtration system 100 will not be influenced.

According to some embodiments of the present disclosure, the filter cartridge assembly 10 may include a pre-filter cartridge, a fine filter cartridge and a post filter cartridge. The pre-filter cartridge is located between the water inlet 110 and the purified-water outlet 120. The impurities in large particles in the raw water may be filtered out by the pre-filter cartridge and hence the purified water is obtained. The purified water may serve as domestic water for cleaning clothes, watering flowers and etc. The fine filter cartridge is located at the purified-water return port 130 and may filter the purified water further so as to filter out the minor impurities in the water. For example, too many inorganic salts and harmful substances (such as organic matters, heavy metal ions, bacteria, virus, pesticides, and tri-chloromethane waste) are all retained, and these harmful foreign matters and salts in the water are discharged out through the waste water being discharged continuously, so that the water quality is improved further. The post filter cartridge is further provided at the pure-water outlet 140, and the waste discharge port 150 is located between the fine filter cartridge and the post filter cartridge. The water flow passing through the fine filter cartridge is further filtered by the post filter cartridge. For example, the post filter cartridge may adopt an activated carbon. On one hand, the activated carbon may absorb a pigment and a peculiar smell in the water through a large amount of fiber gaps in the activated carbon, and on the other hand, the activated carbon may be added with a fruit taste. Thus, the pure water flowing out of the post filter cartridge is clean and safe, and is improved in taste.

Further, the fine filter cartridge may be a reverse osmosis filter cartridge or a nanofiltration membrane filter cartridge. That is, the reverse osmosis filter cartridge may be selected as the fine filter cartridge, and the nanofiltration membrane filter cartridge may also be selected as the fine filter cartridge. It should be noted that the reverse osmosis filter cartridge has a tiny pore diameter which may reach one millionth of the hair (0.0001 microns), and hence only water molecules and some mineral ions can pass through, so that the impurities, bacteria and virus in the water can be filtered out effectively. However, the water flow has a characteristic of flowing from a low concentration to a high concentration under the circumstance of no external force. Thus, it is required to apply a sufficient pressure to the water flow so as to guarantee that the water flow may pass through the reverse osmosis filter cartridge, thus providing an effect of fine filtration. A pore diameter of the nanofiltration membrane filter cartridge ranges around several nanometers, and nanofiltration is a kind of pressure-driven membrane separation process between reverse osmosis and ultrafiltration. A requirement for the water pressure in the fine filtration process of the water filtration system 100 may be reduced by using the nanofiltration membrane filter cartridge, so as to save energy consumption.

It may be understood that the pump assembly 60 may not be provided between the purified-water external port 310 and the purified-water return port 130, the third valve 510 in the waste discharge pipeline 50 may be configured as a manual waste-water valve, the purified-water external-port switch 311 is a manual purified-water valve, the pure-water external-port switch 411 may be selected as a manual pure-water valve, the first valve 320 is a first manual valve, and the second valve 420 is a second manual valve. Thus, in the using process of the water filtration system 100, electric equipment such as the pump is not required and it is only needed to adjust openings and closings of the manual purified-water valve, the manual pure-water valve, the first manual valve, the second manual valve and the manual waste-water valve, so as to achieve purposes of saving electricity and reducing costs.

For example, when it is needed to obtain the purified water, the manual purified-water valve is opened and the manual pure-water valve is kept in a closed state. The raw water flows out of the purified-water outlet 120 after being filtered by the filter cartridge assembly 10, passes through the purified-water pipeline 30 and further flows out of the purified-water external port 310 to be used by a user, in which case almost no waste water is produced and the manual waste-water valve may be kept in a closed state. When it is needed to obtain the pure water, the manual pure-water valve, the manual waste-water valve, the first manual valve and the second manual valve are opened, and the manual purified-water valve is kept in a closed state. The raw water permeates into the fine filter cartridge to be filtered relying on its own pressure, then flows out of the filter cartridge assembly 10 via the pure-water outlet 140, further passes through the pure-water pipeline 40 and finally flows out of the pure-water external port 410 to be used by the user. Moreover, the waste water flows out of the waste discharge pipeline 50.

The water filtration system 100 according to embodiments of the present disclosure will be described in detail with two specific embodiments referring to FIG. 1 and FIG. 2. It is worth understanding that descriptions below are only illustrative and should not be construed as specific limitations to the present disclosure.

Embodiment One

As illustrated in FIG. 1 and FIG. 2, the water filtration system 100 includes: the filter cartridge assembly 10, the water-intake pipe 20, the purified-water pipeline 30, the pure-water pipeline 40, the waste discharge pipeline 50, and the circulation pipeline 70.

As illustrated in FIG. 1 and FIG. 2, the filter cartridge assembly 10 has the water inlet 110, the purified-water outlet 120, the purified-water return port 130, the pure-water outlet 140, and the waste discharge port 150. The filter cartridge assembly 10 is the integrated composite filter cartridge, and includes the pre-filter cartridge, the fine filter cartridge and the post filter cartridge. The pre-filter cartridge is located between the water inlet 110 and the purified-water outlet 120. The fine filter cartridge is the reverse osmosis filter cartridge and located at the purified-water return port 130. The post filter cartridge is located at the pure-water outlet 140.

The water-intake pipe 20 is communicated with the water inlet 110, the first end of the purified-water pipeline 30 is connected to the purified-water outlet 120 and the second end of the purified-water pipeline 30 is connected to the purified-water return port 130. The purified-water pipeline 30 is provided with the purified-water external port 310, the first valve 320 configured to control on and off of the purified-water pipeline 30, and the pump assembly 60 configured to drive the water in the pure-water pipeline 40 to flow. The pump assembly 60 is disposed between the first valve 320 and the purified-water return port 130. The first valve 320 is the solenoid valve, the pump assembly 60 is the booster pump, and the purified-water external-port switch 311 is further provided at the purified-water external port 310.

The pure-water pipeline 40 is connected to the pure-water outlet 140. The pure-water pipeline 40 is provided with the pure-water external port 410 and the second valve 420 configured to control on and off of the pure-water pipeline 40. The second valve 420 is the check valve. The pure-water external-port switch 411 is further provided at the pure-water external port 410. The first end of the waste discharge pipeline 50 is communicated with the waste discharge port 150 and the second end of the waste discharge pipeline 50 is communicated with the outside. The waste discharge pipeline 50 is provided with the third valve 510 configured to control on and off of the waste discharge pipeline 50, and the third valve 510 is the solenoid valve. The first end of the circulation pipeline 70 is communicated with the waste discharge pipeline 50 and the second end of the circulation pipeline 70 is located between the first valve 320 and the pump assembly 60. The circulation pipeline 70 is provided with the throttle valve 710.

As illustrated in FIG. 1, when the water filtration system 100 produces the purified water, the purified-water external-port switch 311 is closed, a part of the purified-water pipeline 30 is on, the first valve 320 is closed and the pump assembly 60 is turned off, the pure-water pipeline 40 and the waste discharge pipeline 50 are blocked (as illustrated in FIG. 1, the pure-water pipeline 40 and the waste discharge pipeline 50 are represented in dashed lines), and the water flow in the water filtration system 100 flows in the direction indicated by arrows: a1→a2→a3→a4 illustrated in FIG. 1. As illustrated in FIG. 1, the raw water flows through the water-intake pipe 20 and further enters the filter cartridge assembly 10 via the water inlet 110 to be filtered preliminarily by the pre-filter cartridge, so as to produce the purified water. The purified water flows out of the filter cartridge assembly 10 via the purified-water outlet 120 and further flows out of the purified-water external port 310. Thus, the purified water is obtained and may serve as domestic water for cleaning clothes, watering flowers and etc.

When the water filtration system 100 produces the pure water, as illustrated in FIG. 2, the purified-water external-port switch 311 is opened, and the pure-water external-port switch 411 is closed. When the pure-water external-port switch 411 is closed, the second valve 420 detects that the downstream water pressure is decreased, and delivers the signal indicating the decreased water pressure to the system. The system opens the first valve 320, turns on the pump assembly 60 and unblocks the purified-water pipeline 30, the pure-water pipeline 40 and the waste discharge pipeline 50. The purified-water external port 310 is off (as illustrated by the dashed lines at the purified-water external port 310 in FIG. 2). The water flow in the water filtration system 100 flows in the direction indicated by arrows: b1→b2→b3→b4→b5.

As illustrated in FIG. 2, when the pure water is produced, the raw water flows through the water-intake pipe 20 and further enters the filter cartridge assembly 10 via the water inlet 110 to be filtered preliminarily by the pre-filter cartridge, so as to produce the purified water. The purified water is discharged out of the purified-water outlet 120, then passes through the first valve 320 and the pump assembly 60 along the purified-water pipeline 30 and returns to the filter cartridge assembly 10 via the purified-water return port 130. The purified water flow may be pressurized by the pump assembly 60, and the purified water flow after the pressurization returns to the filter cartridge assembly 10 and is further filtered by the fine filter cartridge. The water after being filtered by the fine filter cartridge is filtered again by the post filter cartridge so as to improve the water quality and the taste. Finally, the pure water obtained flows out of the pure-water outlet 140 and further out of the pure-water pipeline 40. Thus, the pure water obtained may serve as drinking water or may be used for cooking.

It should be noted that the waste water is produced in the process of pure water preparation. The waste water may be discharged out of the waste discharge port 150, then pass through the waste discharge pipeline 50, and finally be directly discharged out of the water filtration system 100 (i.e. the flow direction indicated by arrows: c50→d60 in FIG. 2). A part of the waste water may return to the purified-water pipeline 30 through the circulation pipeline 70 (i.e. the flow direction indicated by arrows: c50→e60→e70 in FIG. 2), and further flow into the filter cartridge assembly 10 to be filtered again. Thus, the waste water is recycled and the water resources are saved.

Accordingly, by providing the filter cartridge assembly 10, the water filtration system 100 has a compact structure and an optimized pipeline arrangement. In addition, by providing the purified-water pipeline 30 and the pure-water pipeline 40 in the water filtration system 100 respectively, external ports for different water qualities may be selected according to different requirements for water usage in life, which facilitates operations, reduces waste, saves energy and decreases consumption. Furthermore, by providing the circulation pipeline 70 to the water filtration system 100, the waste water may be recycled, and thus the water resources are saved.

Embodiment Two

Different from Embodiment one, in this embodiment, the pump assembly 60 between the purified-water external port 310 and the purified-water return port 130 is cancelled. Moreover, the third valve 510 in the waste discharge pipeline 50 is configured as the manual waste-water valve, the purified-water external-port switch 311 is the manual purified-water valve, the pure-water external-port switch 411 may be selected as the manual pure-water valve, the first valve 320 is the first manual valve, and the second valve 420 is the second manual valve.

When it is needed to obtain the purified water, the manual purified-water valve may be opened and the manual pure-water valve is kept in a closed state. The raw water flows out of the purified-water outlet 120 after being filtered by the filter cartridge assembly 10, then passes through the purified-water pipeline 30 and further flows out of the purified-water external port 310 to be used by the user, in which case almost no waste water is produced and the manual waste-water valve may be kept in a closed state. When it is needed to obtain the pure water, the manual pure-water valve, the manual waste-water valve, the first manual valve and the second manual valve may be opened and the manual purified-water valve may be kept in a closed state. The raw water permeates into the fine filter cartridge to be filtered relying on its own pressure, then flows out of the filter cartridge assembly 10 via the pure-water outlet 140, further passes through the pure-water pipeline 40 and finally flows out of the pure-water external port 410 to be used by the user. Moreover, the waste water flows out of the waste discharge pipeline 50.

Thus, in the using process of the water filtration system 100, electric equipment such as the pump is not required and it is only needed to adjust the openings and closings of the manual purified-water valve, the manual pure-water valve, the first manual valve, the second manual valve and the manual waste-water valve, so as to achieve purposes of saving electricity and cutting down costs.

Reference throughout this specification to "an embodiment," "some embodiments," "an illustrative embodiment" "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and illustrated, it shall be understood by those skilled in the art that various changes, modifications, alternatives and variants without departing from the principle of the present disclosure are acceptable. The scope of the present disclosure is defined by the claims or the like.

What is claimed is:

1. A water filtration system, comprising:
   a filter cartridge assembly, wherein the filter cartridge assembly is an integrated composite filter cartridge that has a water inlet for receiving raw water, a purified-water outlet for dispensing purified water that is produced by the integrated composite filter cartridge through a first filtering process, a purified-water return port for receiving at least some of the purified water that is dispensed from the purified water outlet, a pure-water outlet for dispensing pure water that is produced by the composite filter cartridge that is produced by the integrated composite filter cartridge through a second filtering process distinct from the first filtering process and a waste discharge port for dispensing waste water that is produced with the pure water by the integrated composite filter cartridge through the second filtering process;

a water-intake pipe communicated with the water inlet;

a purified-water pipeline configured to connect the purified-water outlet to the purified-water return port, the purified-water pipeline being provided with a purified-water external port and a first valve configured to control on and off of the purified-water pipeline;

a pure-water pipeline communicated with the pure-water outlet, the pure-water pipeline being provided with a pure-water external port and a second valve configured to control on and off of the pure-water pipeline;

a waste discharge pipeline having a first end communicated with the waste discharge port and a second end communicated with an outside; and a circulation pipeline having a first end communicated with the purified-water pipeline and a second end communicated with the waste discharge pipeline, wherein when the water filtration system produces the purified water using the first filtering process of the integrated composite filter cartridge, the purified-water pipeline is on and the pure-water pipeline is off; when the water filtration system produces the pure water using the second filtering process of the integrated composite filter cartridge, the purified-water pipeline, the pure-water pipeline and the waste discharge pipeline are on respectively.

2. The water filtration system according to claim 1, further comprising:

a pump assembly configured to drive water in the pure-water pipeline to flow, wherein the pump assembly is disposed in the purified-water pipeline and located between the purified-water external port and the purified-water return port.

3. The water filtration system according to claim 2, wherein the pump assembly is a booster pump.

4. The water filtration system according to claim 2, wherein the first valve is located upstream of the pump assembly.

5. The water filtration system according to claim 4, wherein the first end of the circulation pipeline is connected between the first valve and the pump assembly.

6. The water filtration system according to claim 1, wherein the first valve is a solenoid valve and the second valve is a check valve.

7. The water filtration system according to claim 1, wherein the waste discharge pipeline is provided with a third valve configured to control on and off of the waste discharge pipeline.

8. The water filtration system according to claim 7, wherein the third valve is a solenoid valve.

9. The water filtration system according to claim 1, wherein the circulation pipeline is provided with a throttle valve.

* * * * *